Dec. 9, 1952          K. G. ÅHLÉN          2,620,757

PLANT-SETTING MACHINE

Filed Dec. 28, 1945          3 Sheets—Sheet 1

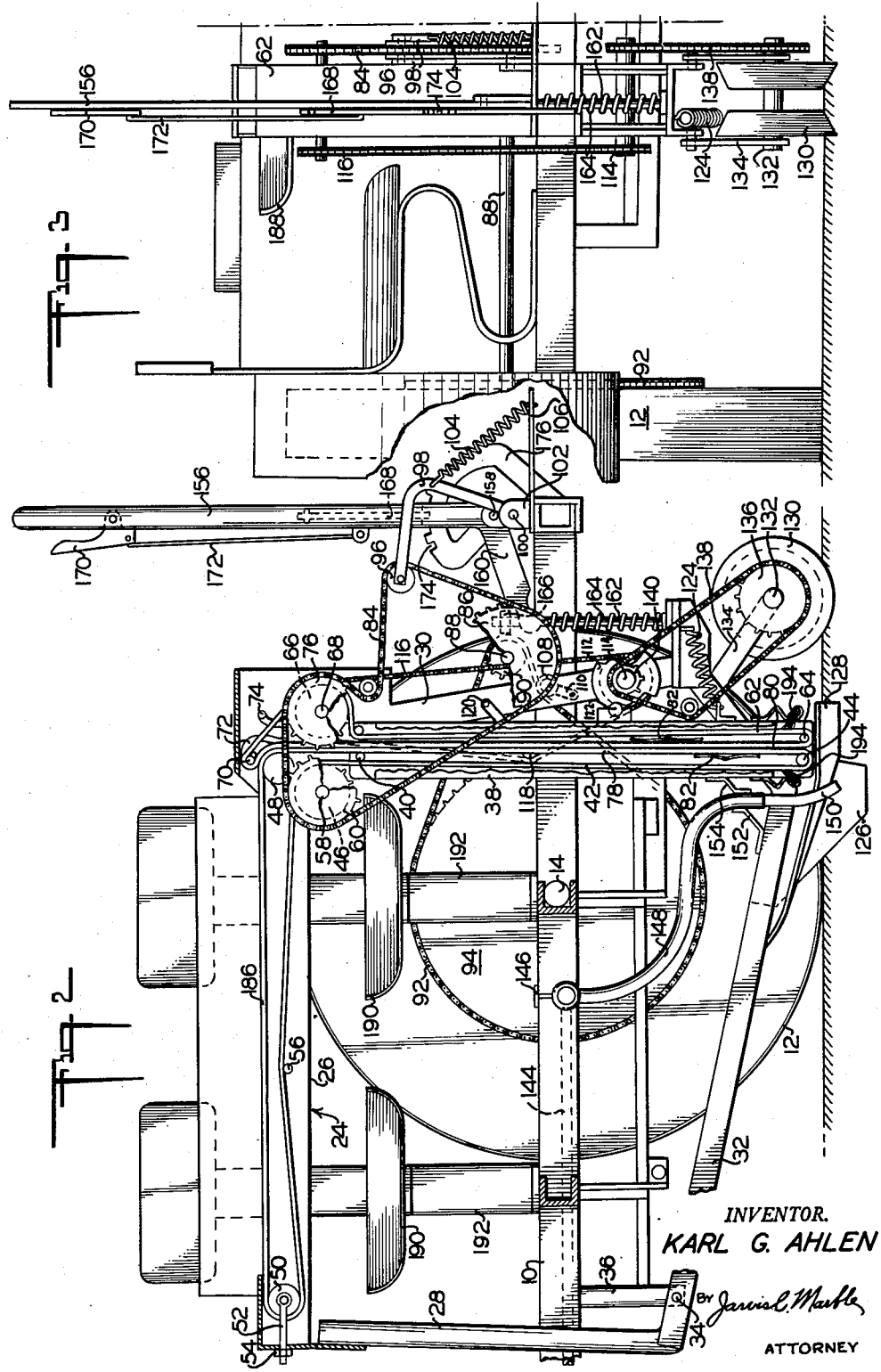

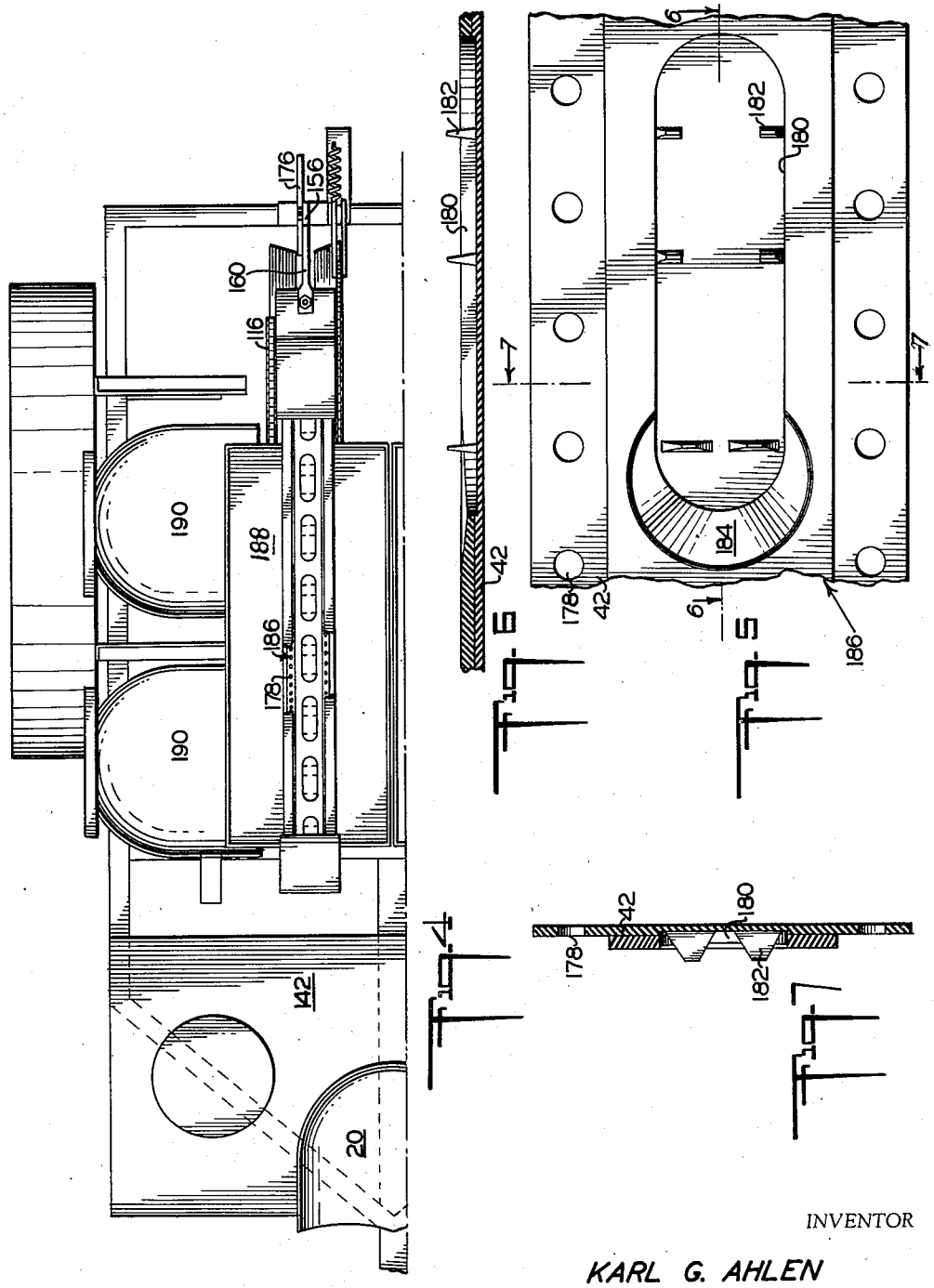

Patented Dec. 9, 1952

2,620,757

UNITED STATES PATENT OFFICE 2,620,757

PLANT-SETTING MACHINE

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., as trustees Application December 28, 1945, Serial No. 637,564 In Sweden December 30, 1944

3 Claims. (Cl. 111—3)

This invention relates to agriculture and more particularly to an apparatus for automatically setting plants or seedlings in the earth.

Heretofore numerous power driven automatic planters have been proposed and manufactured but in the main these have been relatively large cumbersome devices requiring an excessive amount of power to operate and often resulting in damage to the tender plants or seedlings which prevented subsequent proper growth.

It is accordingly an object of the invention to provide a power driven automatic planter which may be operated entirely with unskilled labor and which will efficiently set the plants or seedlings in the earth without damage thereto.

It is a further object of the invention to provide a power driven automatic planter which automatically sets the plants or seedlings in the earth at predetermined distances and which firmly packs the earth therearound to firmly support the plant.

Further objects and advantages of the invention will be apparent from the following description taken in conjunction with the accompanying drawings wherein:

Fig. 1 is a side elevational view partially in section for greater clarity and showing the planter of this invention attached to a towing vehicle such as a tractor;

Fig. 2, a fragmentary side elevational view partially in section for greater clarity and drawn to an enlarged scale showing the details of the planting mechanism;

Fig. 3, a fragmentary rear elevational view of one-half of the planter of this invention;

Fig. 4, a fragmentary top plan view showing the plant conveyor belt and the associated parts for facilitating the placing of plants on such belt;

Fig. 5, a fragmentary top plan view to an enlarged scale of the plant conveyor belt utilized in the planter of this invention;

Fig. 6, a sectional view on the line 6—6 of Fig. 5; and

Fig. 7, a sectional view on the line 7—7 of Fig. 5.

With continued reference to the drawing there is shown in Fig. 1 a planter constructed in accordance with this invention and having a frame or chassis 10 which may be provided with ground engaging wheels 12 mounted upon a transverse axle 14. Chassis 10 is provided with a draw bar 16 which may be suitably coupled to a towing vehicle such as a tractor 18. This tractor may be provided with the usual seat 20 for the driver and a steering wheel 22 for guiding the same over the ground.

The planting mechanism is supported by a generally rectangular frame 24 which is composed of an upper horizontal member 26, a downwardly extending front member 28, a downwardly extending rear member 30 and a rearwardly and downwardly extending lower member 32. Frame 24 is supported for pivotal movement about a horizontal axis by pivot pin 34 extending through lower member 32 and a downwardly depending bracket 36 secured to the chassis 10.

Pivotally mounted on the downwardly extending rear member 30 of the frame 24 is a substantially vertically disposed housing 38 which is pivotally mounted by a pivot pin 40 extending through the downwardly extending rear member 30. Disposed within the casing 38 is a conveyor belt 42 which is trained around a roller 44 located adjacent the lower end of casing 38, belt 42 extending upwardly and over pulleys 46 and 48 and forwardly therefrom over an idler pulley 50 adjustably secured by an eye bolt 52 and a nut 54 to the forward end of the upper horizontal member 26 of frame 24. Belt 42 is also engaged by an idler roller 56 secured to the upper horizontal member 26 in order to impart sufficient tension thereto. Pulley 46 is mounted on a shaft 58 and also secured to this shaft is a sprocket 60, the purpose of which will be presently described.

Also disposed within the casing 38 is a second belt 62 in confronting relation to the belt 42, belt 62 being trained around a pulley 64 disposed at the lower end of casing 38 and the upper end of belt 62 being trained around a pulley 66 mounted on shaft 68 and a second pulley 70. Pulley 70 is carried by a spring member 72 which is anchored at 74 to the frame 24 and spring member 72 serves to urge the pulley 70 in a direction to impart a tension to belt 62 thus maintaining the same in firm driving engagement with pulley 66. Also mounted on shaft 68 is a sprocket 76, the purpose of which will be later described. The confronting portions 78 of belt 42 and 80 of belt 62 are held in engagement throughout their length of travel within the casing 38 by springs 82 in engagement with the rear surfaces thereof these springs being secured to the casing 38.

Belts 42 and 62 are driven by a chain 84 trained over sprockets 60 and 76 and over another sprocket 86 mounted on shaft 88. Also mounted on shaft 88 is a sprocket 90 engaging a chain 92 which in turn is trained over a sprocket 94 mounted upon the axle 14 and driven by the ground engaging wheels 12. Chain 84 is maintained under tension and in proper engagement with the associated sprockets by a tightening roller 96 rotatably mounted upon an arm 98 pivotally mounted at 100 on ears 102 extending upwardly from chassis 10. Arm 98 is biased away from the chain 84 to exert a sufficient tension thereon by a tension spring 104 attached to the arm 98 and extension 106 of the chassis 10. Chain 92 is maintained in firm engagement with sprockets 90 and 94 by an idler roller 108 carried by an arm 110 pivotally mounted on the downwardly extending rear member 30 of frame 24, arm 110 being biased in a direction to exert a proper tension on chain 92.

Since it is necessary that the casing 38 be oscillated about the pivot 40 in synchronization with the forward movement of the planter over the ground and at a frequency whereby there will be substantially zero relative movement between the lower end of the casing 38 and the ground when the lower end of the casing 38 is moving rearwardly and the planter is moving forwardly in order that the plants or seedlings may be deposited in the earth without breakage or pulling the same therefrom, means is provided for accomplishing this purpose in the form of a cam 112 carried by a shaft 114 rotatably mounted on downwardly extending rear member 30 of frame 24. Cam 112 is driven by a chain 116 engaging a sprocket mounted on shaft 114 and another sprocket mounted on a shaft 68. Chain 116 is held in engagement with these sprockets by an idler roller 118 carried by an arm 120 pivotally mounted on downwardly extending rear member 30 of frame 24.

Cam 112 engages a follower 122 mounted upon the casing 38 and as will be seen from an inspection of Fig. 2 as the cam 112 rotates the lobes thereof will urge the casing 38 forwardly and rearward motion of the casing 38 is caused by tension spring 124 connected to the casing 38 and the lower portion of downwardly extending member 30 of frame 24. It will thus be seen that by this mechanism there has been provided means to oscillate the casing 38 about the supporting pivot 40 and in timed relation to the forward movement of the planter and by reason of the contour of the cam 112 and the speed of rotation thereof the oscillatory movement of casing 38 will be such that there will be substantially zero relative motion between the lower end of casing 38 and the ground as the planter moves forwardly thereover.

Since it is necessary that a furrow be provided in the earth within which the plants may be deposited a plow is provided in the form of downwardly extending blades 126 attached to the lower member 32 of frame 24 and likewise since it is necessary to replace the earth removed in forming the furrow after the plant has been deposited therein means is provided in the form of blades 128 also attached to the frame 24. In order to further compact the earth around the plants or seedlings which have been deposited in the furrow there is provided rearwardly of the casing 38 and blades 128 a pair of spaced wheels 130 which are journalled on a shaft 132 and supported by a bracket 134 secured to the rear downwardly extending member 30 of frame 24. Wheels 130 are driven by a sprocket 136 attached to shaft 132 there being a chain 138 trained over this sprocket and over another sprocket 140 mounted on shaft 114. Since shaft 114 is driven in timed relation to movement of ground engaging wheels 12 compacting wheels 130 will likewise be driven in timed relation and will serve to firmly compact the earth around the plants deposited in the furrow by belts 42 and 62.

It being desirable that water be supplied to the plants and seedlings deposited in the earth a water container in the form of a tank 142 is mounted upon the chassis 10 and from this tank there extends a conduit 144 connected to a valve 146. Also connected to valve 146 is a flexible conduit in the form of a hose 148 which terminates in a nozzle 150 disposed between the plow blades 126 in order to direct water into the furrow formed by such blades. Since it is not necessary that a continuous stream of water be provided but only that such water be emitted from the nozzle 150 as each plant is deposited in the furrow means is provided for intermittently interrupting the flow of such water and such means may well comprise an abutment 152 secured to the lower member 32 of frame 24 and in engagement with the hose 148 and a compressing member 154 secured to the casing 38 and in engagement with the hose 148, compressing member 154 operating upon oscillation of casing 38 to compress the hose 148 and interrupt flow. Since the oscillatory movement of casing 38 is in timed relation to the deposition of plants in the furrow formed by plow blades 126 water will therefore be emitted from nozzle 150 only when such plants have been deposited and will be interrupted by compression of the hose 148 between abutment 152 and compressing member 154 during the interval when plants are being conveyed downwardly by the belts 42 and 62 preparatory to depositing the same within the furrow in the earth.

Since it is necessary to raise the ground engaging elements such as plow blades 126 leveling blades 128 and wheels 130 out of engagement with the ground when transporting the planter from one field to another, mechanism is provided for this purpose in the form of a bell crank lever 156 pivoted at 158 on a bracket extending from chassis 10. Bell crank lever 156 is provided with an arm 160 extending forwardly and through an aperture in this arm extends a rod 162 attached to downwardly extending rear member 30 of frame 24, rod 162 being surrounded by a compression spring 164 and at the upper end thereof being provided with a nut 166 which upon upward movement of the arm 160 causes upward movement of the frame 24 to raise the plow members 126 and associated elements above the ground. Bell crank lever 156 is provided with a pawl 168 which is actuated by a grip lever 170 through a link 172 pawl 168 serving to engage notches 174 in quadrant 176 to maintain the bell crank lever 156 in the desired position of adjustment.

As will be seen from an inspection of Fig. 2 movement of the bell crank lever 156 in a clockwise direction will serve to raise the ground engaging elements out of engagement with the ground and movement in the opposite direction will serve to lower these elements into engagement with the ground whereby normal operation of the planter may proceed. In this position the spring 164 serves to retain these elements in engagement with the ground and should obstructions be encountered the plow blades 126 will simply cause the lower member 32 of frame 24 to ride upwardly against the action of spring 164 and the blades 126 will immediately be urged into reengagement with the ground and form the proper furrow for deposition of plants conveyed downwardly by belts 42 and 62.

As shown in Figs. 5, 6 and 7 conveyor belt 42 may be provided with apertures 178 which are adapted to be engaged by pins or sprocket teeth upon pulleys 46 carried by shafts 56 in order to maintain the movement of the belt 42 synchronized with the movement of the ground engaging wheels 12. Belts 42 may be formed of rubber or other suitable flexible material and may be provided with elongated recesses 180 which are adapted to receive the plants to be deposited by the planter in the furrow in the ground, these recesses 180 also having ribs 182 provided therein to engage and hold the plants or seedlings without damage thereto. The trailing edge of the recess 180 may be provided with a beveled or tapered portion 184 which serves to receive a portion of the plant or seedling carried by belt 42 in order to prevent damage thereto.

As will be seen from an inspection of Figs. 1 and 2 the conveyor belt 42 has an upper horizontal run 186 carried by the upper member 26 of the frame 24 and adjacent to this run 186 there is provided a tray 188 upon which may be disposed the plants to be deposited in the earth by the planter of this invention. Seats 190 supported upon pedestals 192 from the chassis 10 may be provided for the operators and as will be seen from an inspection of the drawing it is only necessary for these operators to select the plants from the tray 188 and to place these plants in the recesses 180 in the belt 42 in the proper position to be carried thereby to the planting location.

Since it is obvious that much dirt will be accumulated on belts 42 and 62 means is provided in the form of brushes 194 in engagement with such belts which will serve to remove this material therefrom.

In operation it is only necessary for the planter of this invention to be coupled to a towing vehicle such as a tractor 18 and to position operators on the seats 190 which operators select and position plants or seedlings within the recesses 180 of the belt 42, these plants being carried rearwardly and downwardly within the casing 38 and being held in position by the engagement of belts 42 and 62 these seedlings or plants being deposited in furrows in the earth formed by blades 126 carried by the lower member 32 of the frame 24 and also water being provided for these seedlings from the nozzle 150 controlled by the abutment 152 and the compressing member 154. Since at the time the plant is deposited in the furrow the casing 38 is moving rearwardly by reason of the action of the cam 112 there will be no relative motion between the casing 38 and the earth and consequently the plant will be deposited in the furrow without withdrawing the same from such furrow. After depositing the plant in the furrow the earth is replaced by the blades 128 carried by the lower member 32 of frame 24 and the earth is further compacted around the plant by wheels 130. This operation may of course be carried on indefinitely by providing a sufficient supply of plants in the trays 188.

It is to be understood that the mechanism above described is provided in duplicate on each planter whereby plants may be set simultaneously in spaced parallel rows.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. In a plant setting machine, a vehicle adapted for forward travel over the ground, a plant setting device supported on said vehicle and comprising a first endless belt having a substantially vertical feeding portion and a loading portion disposed at a substantial angle to said feeding portion, a second endless belt also supported on said vehicle and having a substantially vertical feeding portion disposed in closely confronting juxtaposition to the feeding portion of said first belt, said feeding portions of said belts cooperating to receive and convey therebetween objects such as plants and the like placed on said loading portion, said feeding portions being generally disposed in a vertical plane parallel to the line of travel to the vehicle with the lower ends of said feeding portions terminating adjacent the ground to form a delivery end, means supporting said feeding portions for movement in said vertical plane, means for actuating said belts to move the feeding sections thereof downwardly in unison, means synchronized with the forward travel of the vehicle and with the means for actuating said belts for intermittently imparting to the delivery end of said feeding portions a rearward movement to compensate for forward travel of the vehicle at the time the object is being delivered, whereby periods are provided during which there is substantially no relative horizontal movement of said delivery end and the object being delivered therefrom on the one hand and the ground on the other.

2. In a planting machine as set forth in claim 1, said first mentioned means comprising a pivotally mounted supporting structure and said third mentioned means comprising means to oscillate said structure to provide said movement of the delivery end.

3. In a planting machine as set forth in claim 1, said second belt having a portion in cooperative confronting relation to said first belt forwardly of said feeding portions.

KARL GUSTAV ÅHLÉN.

REFERENCES CITED

The following references are of record in the file of this patent:

UNITED STATES PATENTS

| Number | Name | Date |
|---|---|---|
| 474,425 | Updike | May 10, 1892 |
| 964,820 | Snyder | July 19, 1910 |
| 1,106,405 | Poucher | Aug. 11, 1914 |
| 1,398,190 | Howard | Nov. 22, 1921 |
| 1,484,248 | Austin | Feb. 19, 1924 |
| 1,568,594 | Flint | Jan. 5, 1926 |
| 1,573,270 | Pearson | Feb. 16, 1926 |
| 1,657,944 | Stocker et al. | Jan. 31, 1928 |
| 1,848,865 | Bacle | Mar. 8, 1932 |
| 1,948,332 | Carter | Feb. 20, 1934 |
| 2,145,771 | McCartney | Jan. 31, 1939 |
| 2,197,225 | Pierson | Apr. 16, 1940 |
| 2,294,348 | Kolstad | Apr. 25, 1942 |

FOREIGN PATENTS

| Number | Country | Date |
|---|---|---|
| 33,844 | France | Aug. 28, 1928 |
| | (1st addition to No. 634,451) | |
| 434,035 | Germany | Sept. 17, 1926 |